Nov. 27, 1934.　　W. L. LAWLER　　1,982,059
POWER CHURN
Filed Oct. 11, 1932
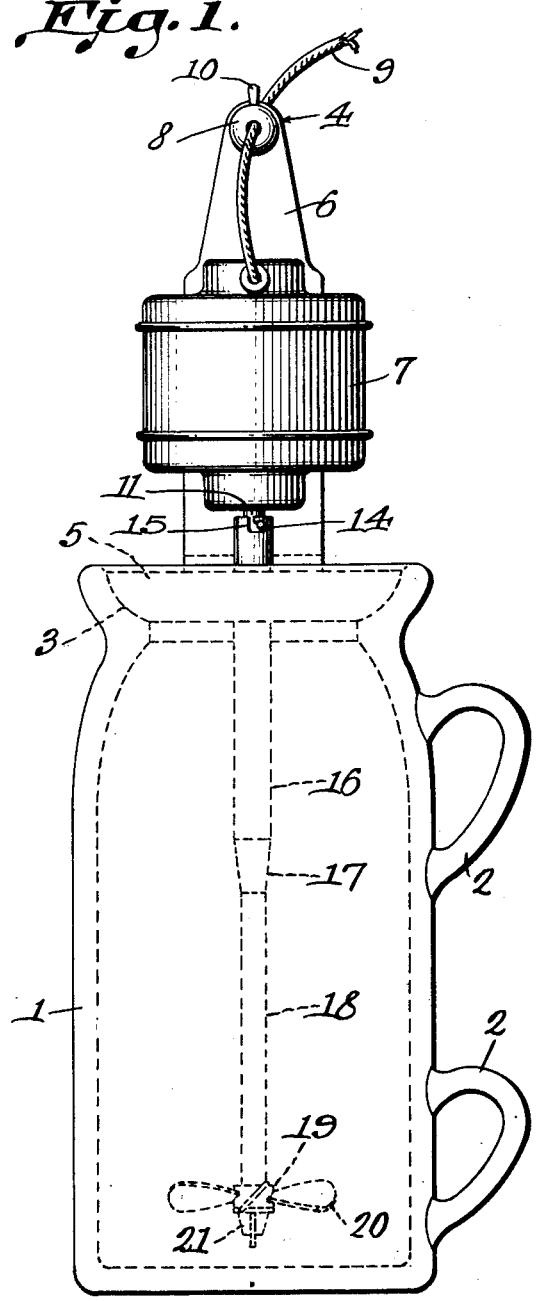
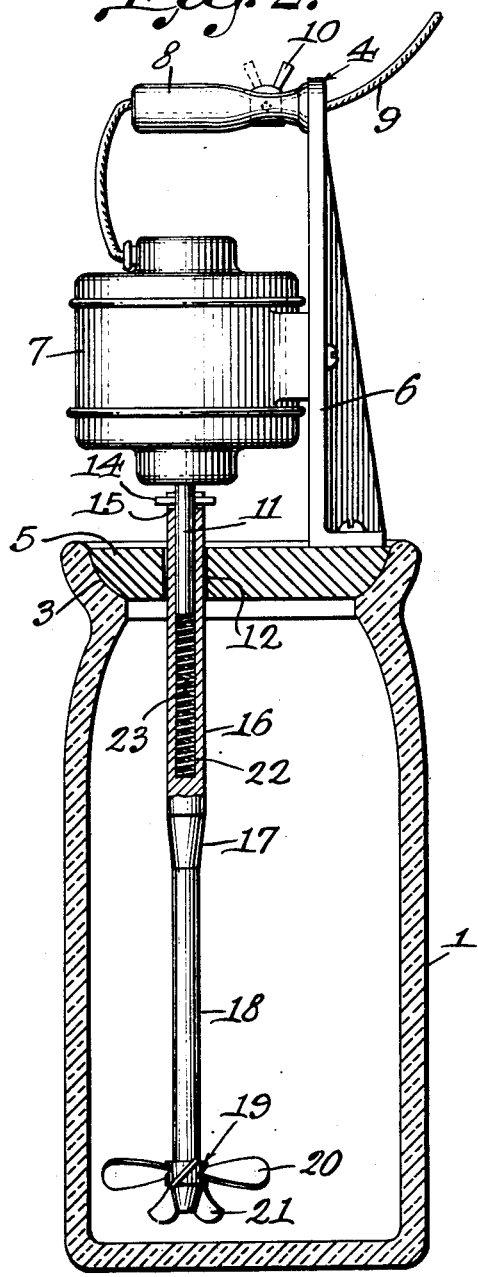
W. L. Lawler Inventor Patented Nov. 27, 1934

1,982,059

UNITED STATES PATENT OFFICE 1,982,059

POWER CHURN

William Lister Lawler, Birmingham, Ala.

Application October 11, 1932, Serial No. 637,336

2 Claims. (Cl. 259—108)

This invention aims to provide a simple churn, adapted to be used in the household, although the churn, in a larger form, may be used wherever desired.

The invention aims to provide novel means for driving the beater, to provide novel means for connecting the beater operatively with the electric motor, and to provide a simple and convenient means whereby the operation of the electric motor is easily within control.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawing:

Fig. 1 shows in elevation, a device constructed in accordance with the invention;

Fig. 2 is a longitudinal section wherein parts appear in elevation;

In carrying out the invention, there is provided a receptacle 1, which may be of any desired size and shape. The receptacle 1 may be equipped with side handles 2. In the upper end of the receptacle 1 there is a seat 3.

The numeral 4 designates a support, which is a composite structure. The support 4 includes a disk-like base 5, shaped to fit closely but rotatably in the seat 3. A vertical standard 6 is secured to the base 5, near to the edge thereof, and is disposed at right angles to the base.

An electric motor 7 is secured to the inner side of the standard 6, and is disposed above the base. At its upper end, the standard 6 is supplied with an inwardly projecting handle 8, which overhangs the motor 7. The circuit wires 9 for the motor 7 pass through the handle 8 and through the standard 6. An electrical switch 10 is interposed in the motor circuit 9 and is carried by the handle 8, near to the inner end thereof.

The vertical, depending shaft of the motor 7 is designated by the numeral 11, and extends downwardly through a hole 12 in the base 5. The shaft 11 of the motor 7 carries a projection or cross pin 14, adapted to be received in bayonet slots 15 in the enlarged upper portion 16 of a shaft 17 extended downwardly into the receptacle 1, the shaft comprising a reduced lower portion 18 to which a beater 19 is removably secured, the beater comprising inclined, radial blades 20, a wing nut 21, or the like, being used to fasten the beater 19 to the lower end of the part 18 of the shaft 17. The enlarged upper portion 16 of the shaft 17 has a longitudinal bore 22, in which the lower part of the motor shaft 11 is received.

A compression spring 23 is located in the bore 22, the lower end of the spring abutting against the part 16 of the shaft 17, and the upper end of the spring abutting against the lower end of the motor shaft 11, to hold the projection 14 assembled with the bayonet slots 15.

In practical operation, the switch 10 is closed, and the motor 7 is put into operation. The shaft 11 of the motor rotates the shaft 17, and the shaft 17 turns the beater 19. When the hand of the operator is placed on the handle 8, for the purpose of mounting the support 4 on the receptacle 1, or for the purpose of removing the support from the receptacle, the switch 10 can be operated conveniently, to throw the current on or off. It is to be observed that the hole 12 in the base 5 of the support 4 receives the part 16 of the shaft 17 for rotation, and because the shaft 11 of the motor 7 extends downwardly below the base 5, the upper end of the shaft 17 may be conveniently mounted on the shaft 11. The structure at 14—15 affords a detachable connection, whereby the shaft 17 may be removed from the shaft 11, to permit the shaft 17 to be washed. The shaft 17 is not disposed coaxially with respect to the longitudinal axis of the receptacle 1, but is arranged eccentrically with respect thereto. Consequently, by rotating the base 5, the beater 19 may be brought near to any part of the side wall of the receptacle 1.

The device is simple in construction, but it affords a convenient and practical means whereby a churn may be operated electrically, the control being well within the governance of an operator, and it being possible to take the device apart readily, either for cleaning, or for the removal of the churned product. In this connection, it is to be observed that all that the operator has to do, in order to open the churn, is to take hold of the handle 8, and lift the support 4 off the receptacle 1.

Having thus described the invention, what is claimed is:

1. A churn comprising a receptacle, a support mounted for rotary adjustment about a vertical axis on the upper end of the receptacle, a vertical standard secured to the support near to one edge of the support, an electric motor secured to the inner side of the support and having a vertical depending shaft located (due to the position of the standard on the support) eccentrically with respect to the axis of rotary adjustment of the support, a beater carried by the shaft, the beater being located in the receptacle, close to the side wall thereof, and a horizontal handle on the upper end of the standard and overhanging the motor, the handle having a free outer end, whereby the handle can be grasped conveniently, from one side of the churn, to effect rotary adjustment of the support.

2. A churn comprising a receptacle, a disk-like support on the upper end of the receptacle and having a hole, a motor carried by and located above the support and including a shaft extended downwardly through the hole, the motor shaft being provided with a lateral projection, a beater shaft having a tubular upper part receiving the motor shaft and journaled in the hole, the tubular part of the beater shaft having a bayonet slot receiving the projection, and a beater on the beater shaft and located in the receptacle: the projection and the bayonet slot being located above the support, and the tubular part of the beater shaft substantially filling the hole, so that the churned material cannot work up the beater shaft and upon them, and the motor shaft being of less diameter than the hole, whereby both the hole and the part of the motor shaft that is in the hole can be cleaned when the beater shaft is detached.

WILLIAM LISTER LAWLER.